US010999277B2

(12) United States Patent
Mochizuki

(10) Patent No.: US 10,999,277 B2
(45) Date of Patent: May 4, 2021

(54) COMMUNICATION SYSTEM, RELAY SERVER, INFORMATION PROCESSING APPARATUS, IMAGE FORMING APPARATUS, METHODS OF CONTROLLING THEM, AND STORAGE MEDIUM

(71) Applicant: CANON KABUSHIKI KAISHA, Tokyo (JP)

(72) Inventor: Hirofumi Mochizuki, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 322 days.

(21) Appl. No.: 16/102,980

(22) Filed: Aug. 14, 2018

(65) Prior Publication Data
US 2019/0068595 A1 Feb. 28, 2019

(30) Foreign Application Priority Data
Aug. 24, 2017 (JP) .............................. JP2017-161371

(51) Int. Cl.
*H04L 29/06* (2006.01)
*G06F 21/60* (2013.01)

(52) U.S. Cl.
CPC ........ *H04L 63/0884* (2013.01); *G06F 21/608* (2013.01); *H04L 63/0823* (2013.01); *H04L 63/083* (2013.01)

(58) Field of Classification Search
CPC ............. H04L 63/0884; H04L 63/0823; H04L 63/083; G06F 21/608
See application file for complete search history.

(56) References Cited

U.S. PATENT DOCUMENTS

| 2004/0152446 A1* | 8/2004 | Saunders ............ H04L 63/0853 455/411 |
| 2014/0086105 A1* | 3/2014 | Kang ...................... H04L 67/26 370/259 |
| 2014/0189808 A1* | 7/2014 | Mahaffey ............ H04L 63/0853 726/4 |

(Continued)

FOREIGN PATENT DOCUMENTS

| JP | 2013029922 A | 2/2013 |
| JP | 2014059720 A | 4/2014 |
| JP | 2017054458 A | 3/2017 |

*Primary Examiner* — Samson B Lemma
*Assistant Examiner* — Abdullah Almamun
(74) *Attorney, Agent, or Firm* — Venable LLP

(57) ABSTRACT

A communication system has first terminal and second terminals, and a relay server that relays communication between the first and second terminals. When a login request is received including authentication information from the first terminal, the relay server associates and stores, in a storage, identification information of the first terminal corresponding to the authentication information and access information for accessing the relay server; and sends the access information to the first terminal. When a login request has been received including authentication information from the second terminal, the relay server sends to the second terminal the access information specified based on the identification information of the first terminal sent from the second terminal and information stored in the storage, and relays communication between the first and second terminals based on the access information.

10 Claims, 12 Drawing Sheets

(56) References Cited

U.S. PATENT DOCUMENTS

| | | | |
|---|---|---|---|
| 2015/0181057 A1* | 6/2015 | Mutsuno | H04N 1/00925 358/1.14 |
| 2015/0301765 A1* | 10/2015 | Nishiyama | G06F 3/1203 358/1.15 |
| 2015/0341348 A1* | 11/2015 | Yang | H04L 63/0428 726/7 |
| 2017/0078512 A1 | 3/2017 | Mochizuki | |

\* cited by examiner

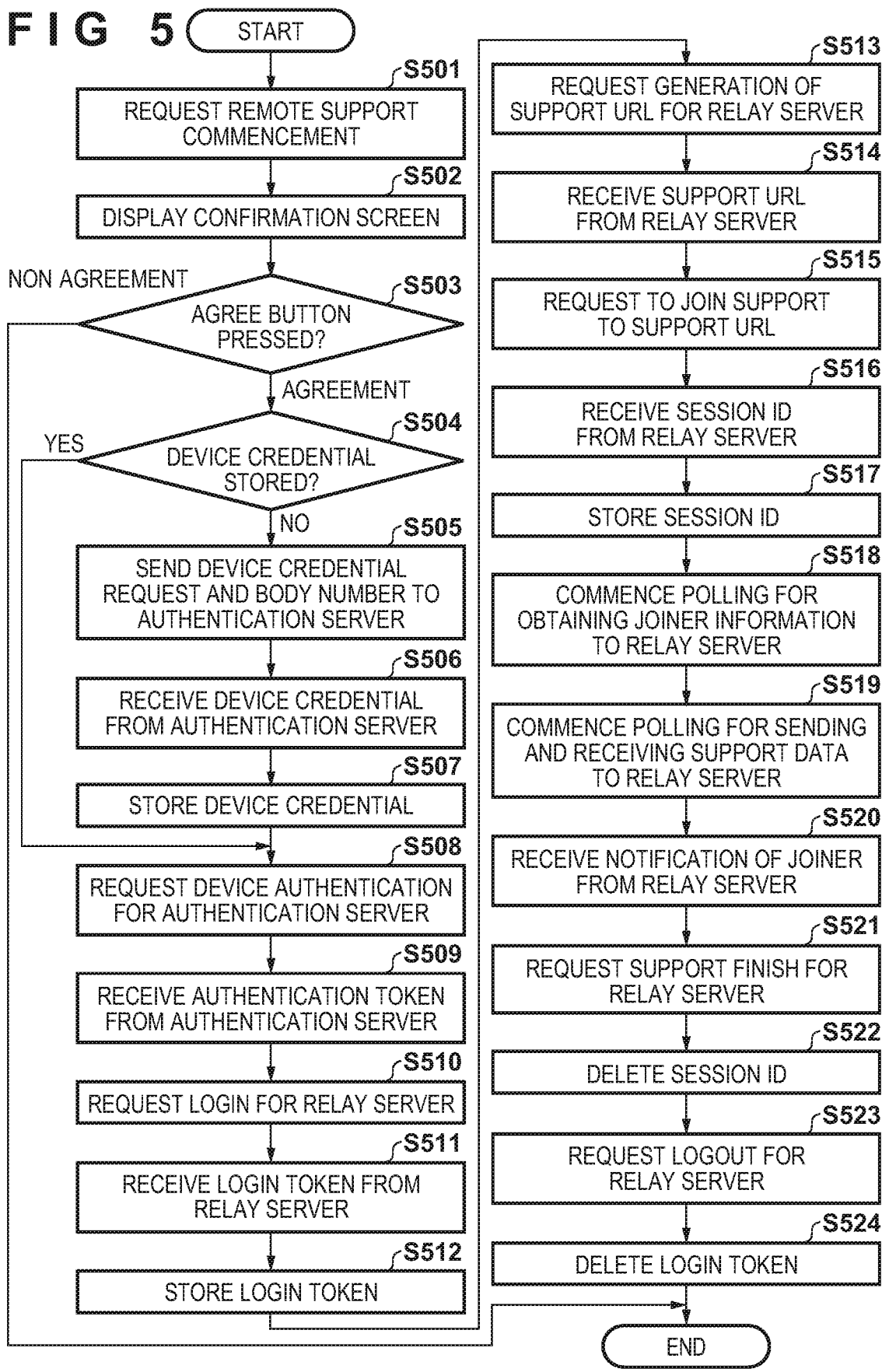

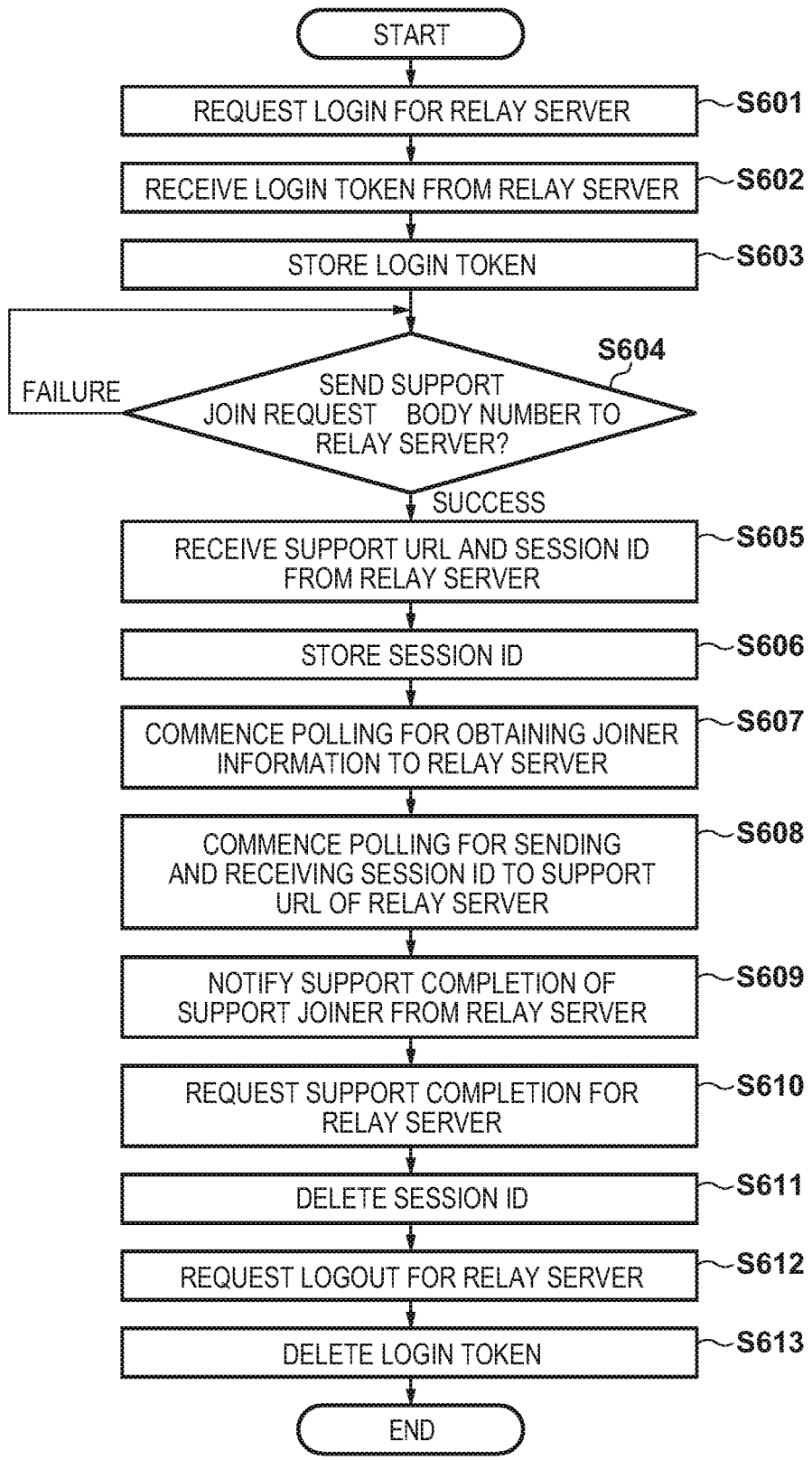

FIG. 7A
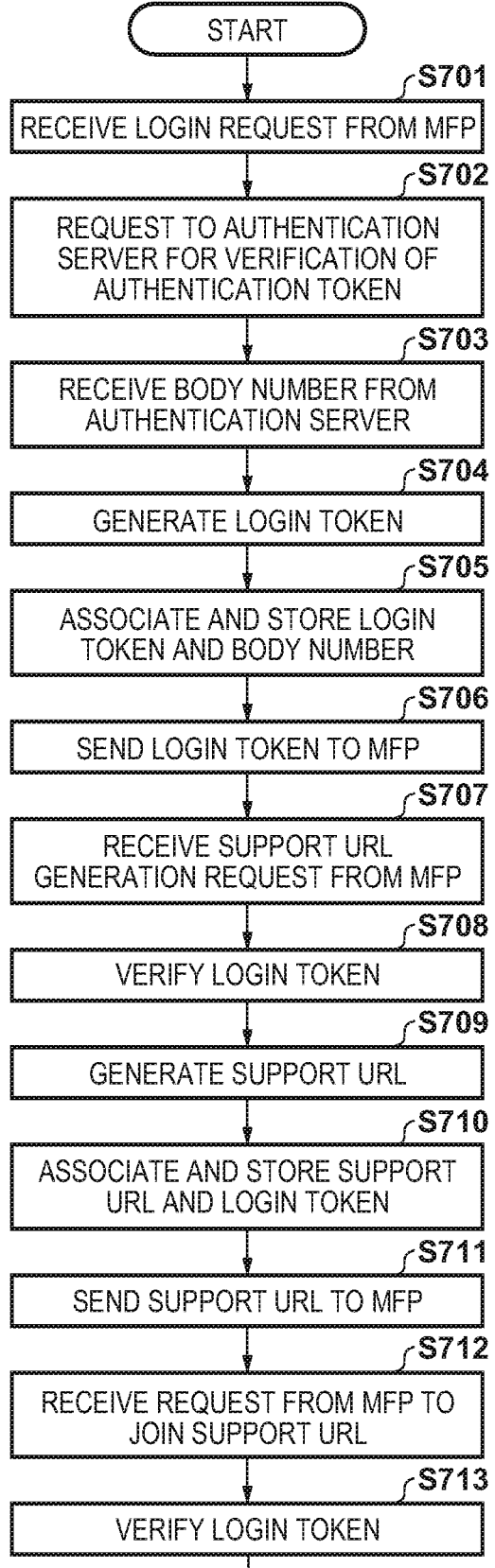
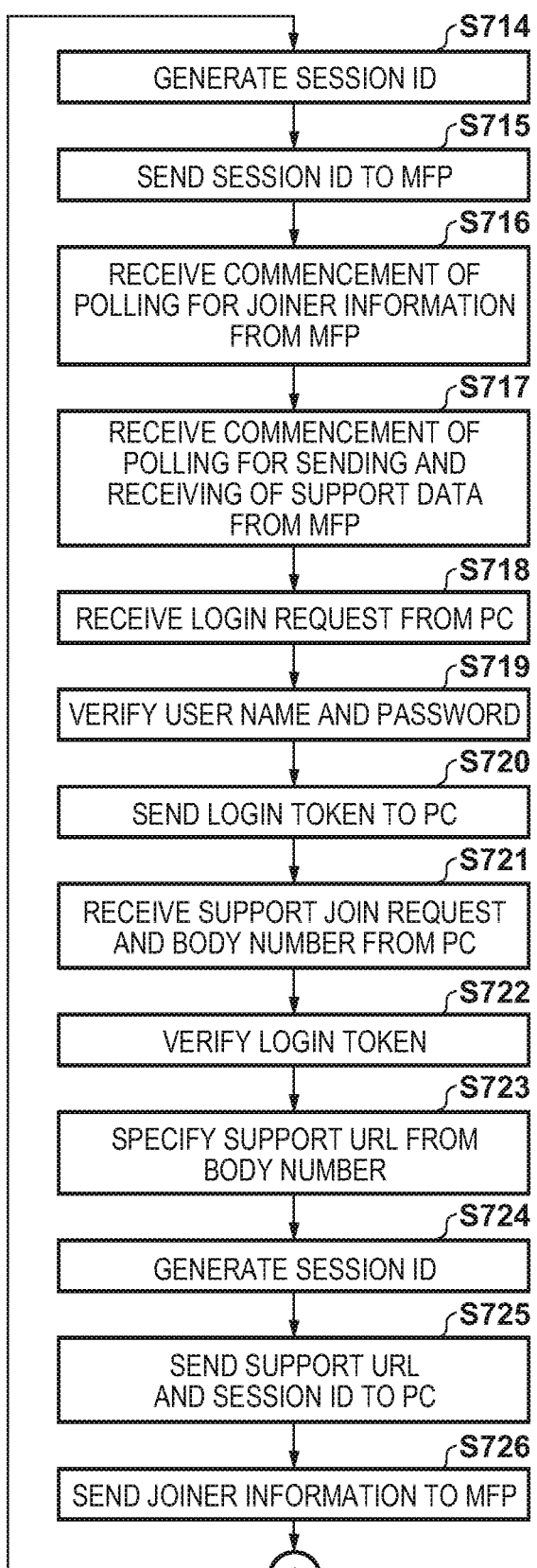

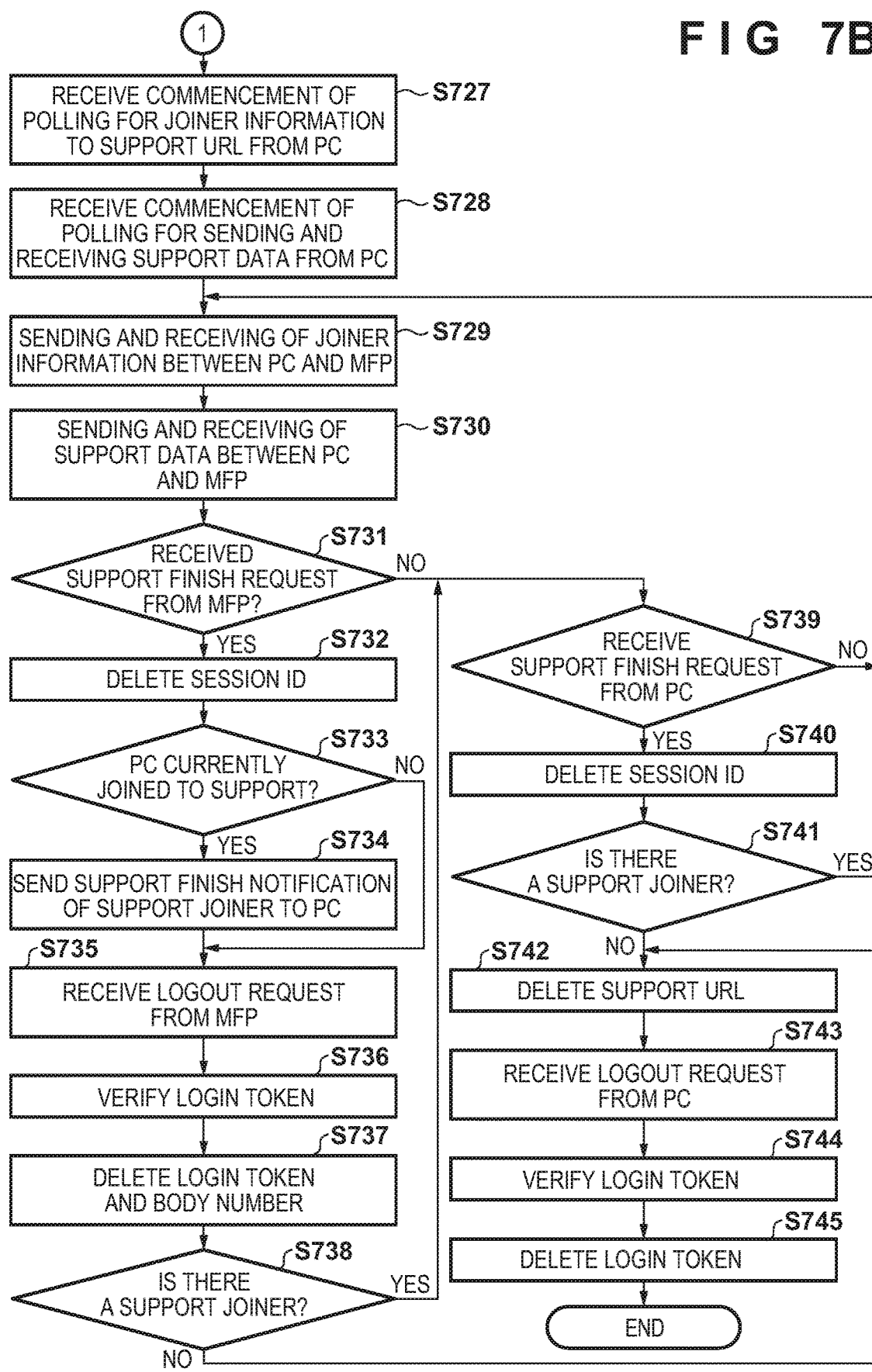

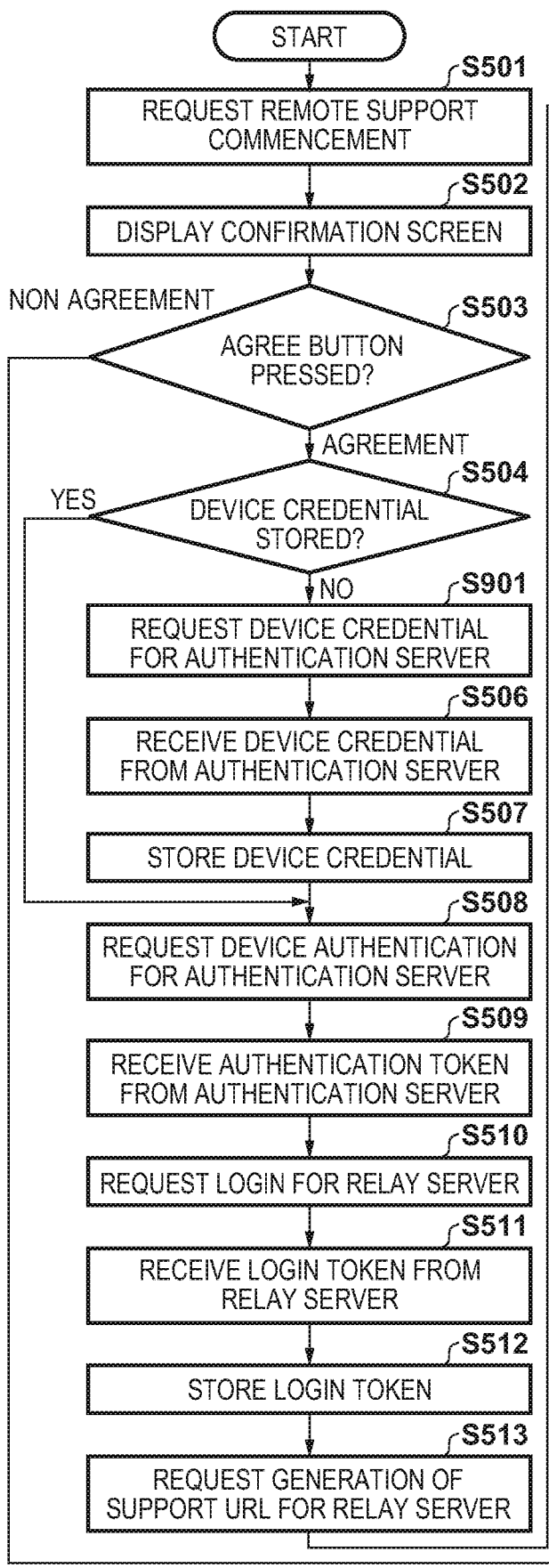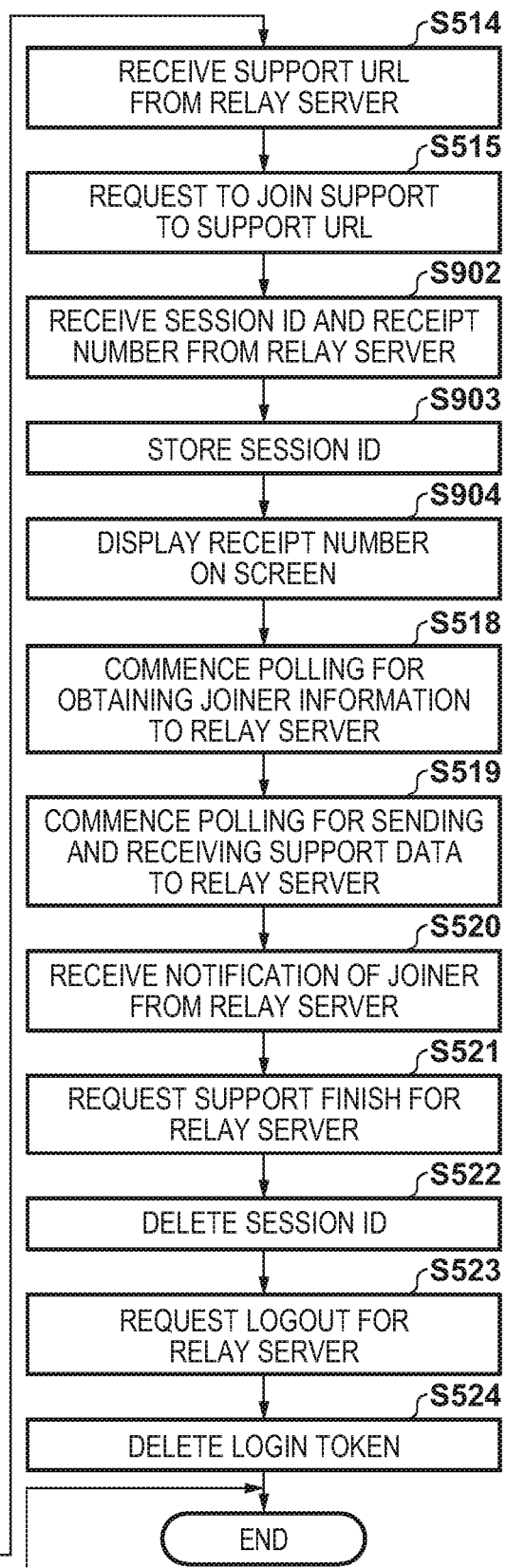
FIG 9

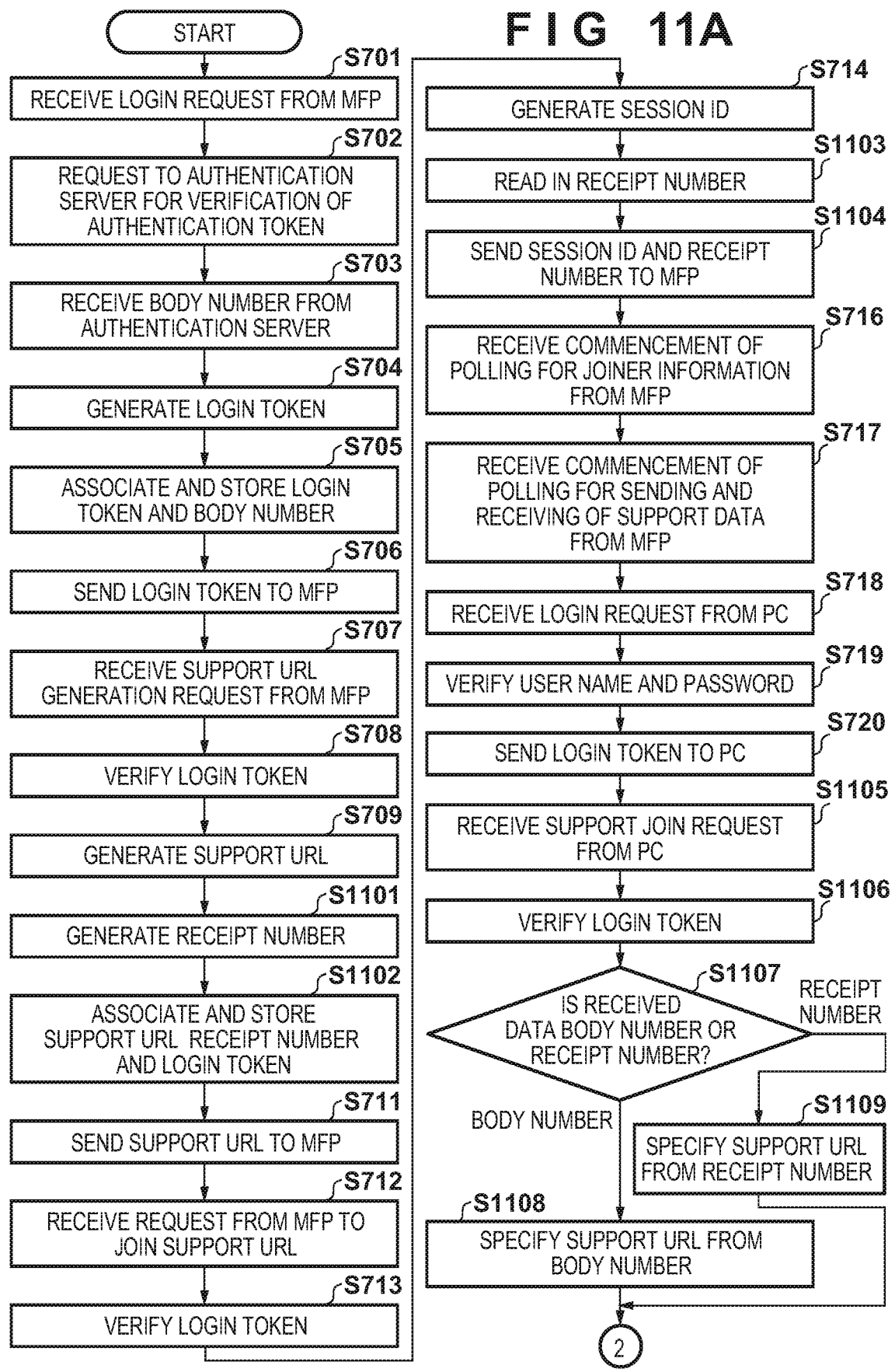

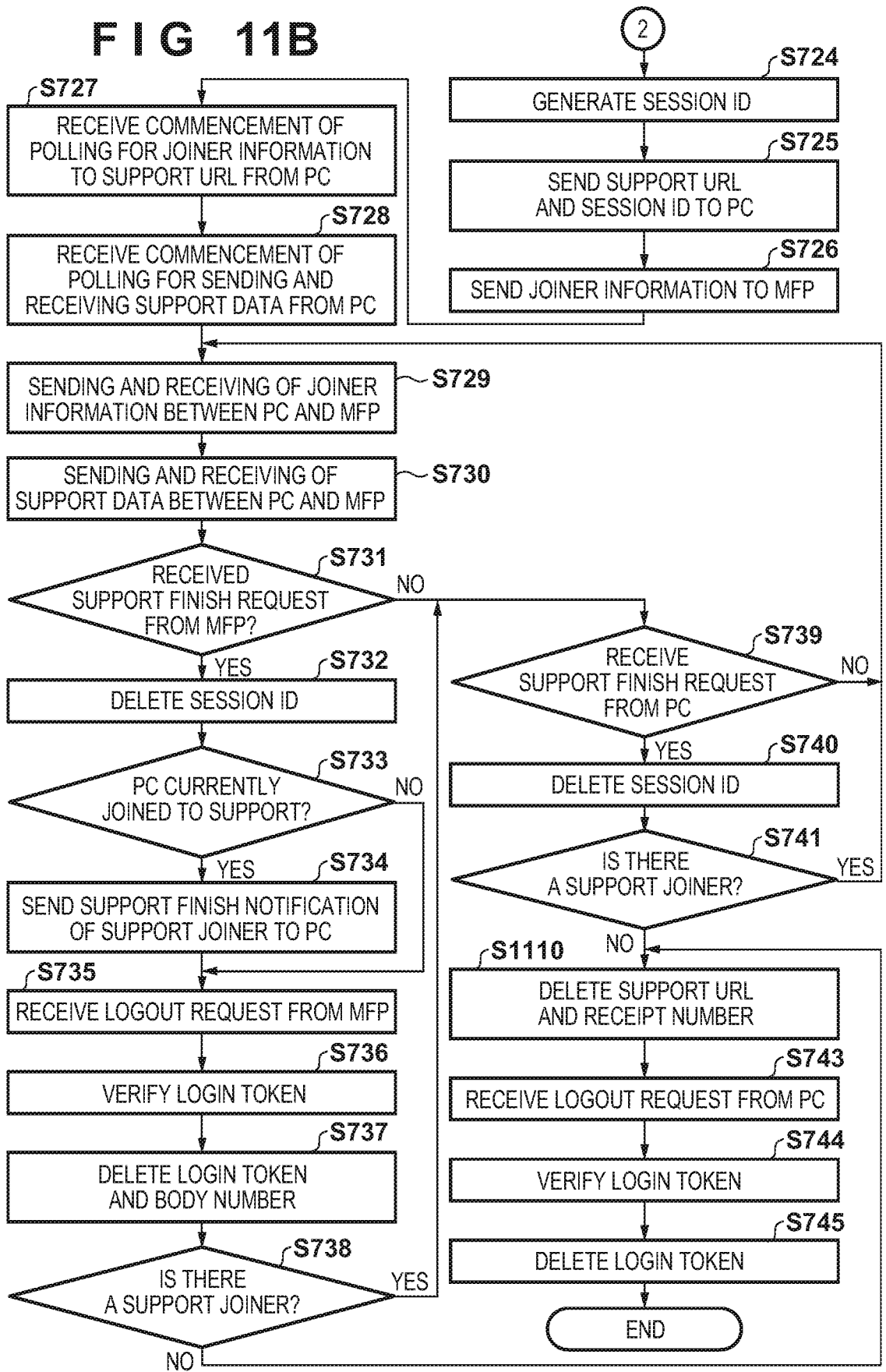

COMMUNICATION SYSTEM, RELAY SERVER, INFORMATION PROCESSING APPARATUS, IMAGE FORMING APPARATUS, METHODS OF CONTROLLING THEM, AND STORAGE MEDIUM

BACKGROUND OF THE INVENTION

Field of the Invention

The present invention relates to communication systems, relay servers, information processing apparatuses, image forming apparatuses, methods of controlling them, and storage media.

Description of the Related Art

It frequently occurs that a customer will directly ask questions to a call center of a manufacturer to obtain answers to complex problems with a product. Japanese Patent Laid-Open No. 2014-59720 proposes a remote maintenance service based on voice and video communications and remote control in order to carry out the handling of problems swiftly between a customer that owns an image forming apparatus and the call center.

With this service, the customer first telephones the call center when a problem in the image forming apparatus has occurred. Generally, in a query to the call center, the customer tells an operator at the call center the body number of the image forming apparatus along with a description of the problem. In this way, by using the body number to query a management server that manages body information and information of contracted customers, the operator obtains information of the image forming apparatus and customer information, and applies these for the query. It should be noted that the body number is a globally unique identifier for specifying the image forming apparatus.

In a case where the operator judges from the content of the query to the management server that the problem can be solved using remote control support, the operator guides the customer to commence remote control support. In regard to the aforementioned remote maintenance service, the image forming apparatus that is receiving support and the information processing apparatus of the call center that is carrying out the support are generally behind a firewall. Japanese Patent Laid-Open No. 2013-29922 proposes installing a relay server that relays communications between the image forming apparatus and the information processing apparatus in order to carry out communications between these on the internet. By installing a relay server such as this, communications can be carried out between devices that are behind firewalls.

In order to carry out communications between these devices via the relay server, it is necessary to identify the communication partner on the relay server. Thus, as a method for identifying the communication partner, Japanese Patent Laid-Open No. 2017-54458 proposes a method in which the relay server generates a receipt number when a device connects to the relay server, and the communication partner is identified by inputting this receipt number.

However, as stated above, in a case of using a method in which the communication partner is identified by inputting a receipt number, the user of the image forming apparatus must read out the receipt number to notify the operator at the call center after the body number has been conveyed on the telephone. In this case, the user must convey two pieces of information to the operator, namely the body number and the receipt number, and for the user this results in the burden of being bothered two times.

SUMMARY OF THE INVENTION

An aspect of the present invention is to eliminate the above-mentioned problem with conventional technology.

A feature of the present invention is to provide a technique that enables easy commencement of remote control support without burdening the user.

According to a first aspect of the present invention, there is provided a communication system having a first terminal and a second terminal, and a relay server that relays communication between the first terminal and the second terminal, wherein the relay server includes: a first memory device that stores a set of instructions; and a first processor that executes the instructions to: in a case where a login request is received including authentication information from the first terminal, associate and store, in a storage, identification information of the first terminal corresponding to the authentication information and access information for accessing the relay server; send the access information to the first terminal; in a case where a login request has been received including authentication information from the second terminal, send to the second terminal the access information that has been specified based on the identification information of the first terminal sent from the second terminal and information stored in the storage; and relay communication to be carried out between the first and the second terminals based on the access information.

According to a second aspect of the present invention, there is provided a relay server that relays communications between a first terminal and a second terminal, including: a memory device that stores a set of instructions; and at least one processor that executes the instructions to: in a case where a login request is received including authentication information from the first terminal, associate and store, in a storage, identification information of the first terminal corresponding to the authentication information and access information for accessing the relay server; send the access information to the first terminal; in a case where a login request has been received including authentication information from the second terminal, send to the second terminal the access information that has been specified based on the identification information of the first terminal sent from the second terminal and information stored in the storage; and relay communication to be carried out between the first and the second terminals based on the access information.

According to a third aspect of the present invention, there is provided an image forming apparatus that receives remote control support from an information processing device via a relay server, including: a memory device that stores a set of instructions; and at least one processor that executes the instructions to: instruct commencement of the remote control support; register identification information of the image forming apparatus in an authentication server; send an authentication request including the identification information of the image forming apparatus to the authentication server in response to an instruction of the commencement of the remote control support; receive an authentication token sent from the authentication server in response to the authentication request; request generation of access information to the relay server for the remote control support to the relay server based on the authentication token, wherein the relay server associates and stores, in a storage, the identification information corresponding to the authentication token and the access information; and when obtaining the access information from the relay server in response to a request of the generation of access information, carry out sending and receiving of information between the information processing device via the relay server based on the access information, wherein the relay server, upon receiving the identification information of the image forming apparatus from the information processing device, sends to the information processing device the access information specified based on the identification information that has been received and information stored in the storage.

According to a fourth aspect of the present invention, there is provided an information processing apparatus that carries out remote control support of an image forming apparatus via a relay server, including: a memory device that stores a set of instructions; at least one processor that executes the instructions to: send a login request to the relay server; instruct joining of the remote control support with identification information of the image forming apparatus to the relay server after a login according to the login request; receive access information to the relay server sent from the relay server in response to an instruction of joining of the remote control support, wherein the access information is associated with the identification information of the image forming apparatus and stored in the relay server; and carry out sending and receiving of information between the information processing device and the image forming apparatus via the relay server based on the access information.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 5 is a flowchart for describing processing executed by the MFP according to the first embodiment.

FIG. 6 is a flowchart for describing processing executed by the PC according to the first embodiment.

FIGS. 7A and 7B are flowcharts for describing processing executed by the relay server according to the first embodiment.

FIG. 9 is a flowchart for describing processing executed by the MFP according to a second embodiment.

FIGS. 11A and 11B are flowcharts for describing processing executed by the relay server according to the second embodiment.

DESCRIPTION OF THE EMBODIMENTS

Embodiments of the present invention will be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention.

First Embodiment

First, description is given regarding a first embodiment of the present invention.

Figure 1:
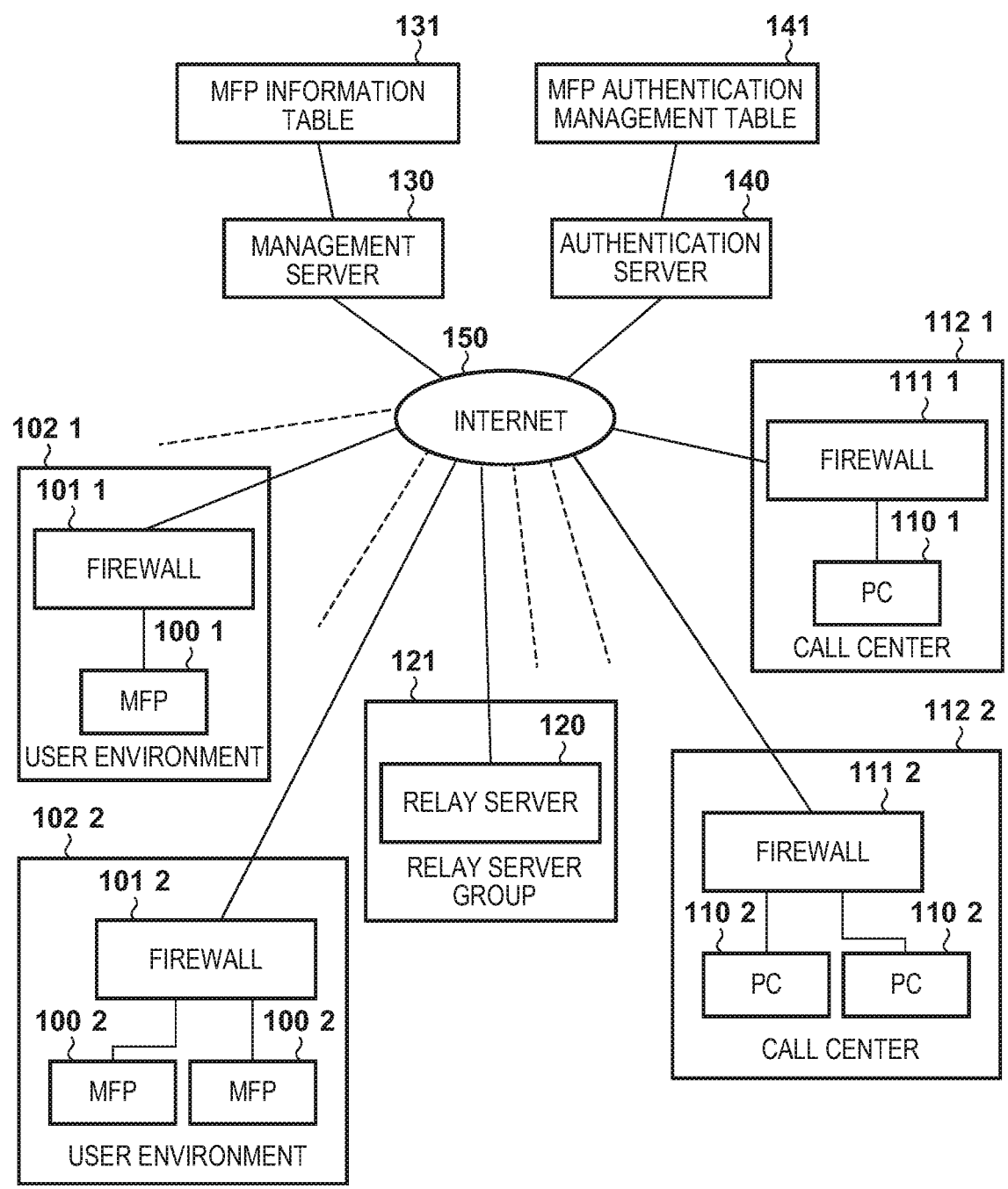
FIG. 1 is a diagram showing an example configuration of a communication system capable of providing a secure remote control support service via a network and is according to a first embodiment of the present invention.

FIG. 1 is a diagram showing an example configuration of a communication system capable of providing a secure remote control support service via a network and is according to the first embodiment of the present invention.

MFPs (multi-function peripherals) 100-1 and 100-2 are positioned in user environments 102-1 and 102-2 respectively, these being controlled by a user, and are accessible via an internet 150. Here, the MFPs are one example of an image forming apparatus, which is a multifunctional processing device having functions such as a copying function, a scanning function, a box function, a fax transmission and reception function, and a printing function.

PCs 110-1 and 110-2 are positioned within call centers 112-1 and 112-2 respectively, and are information processing devices controlled by an operator in each of the call centers. Present here are multiple user environments, call centers, image forming apparatuses (MFPs), and PCs.

Furthermore, firewalls 101-1 and 101-2 are installed in the user environments 102-1 and 102-2 respectively, and firewalls 111-1 and 111-2 are installed in the call centers 112-1 and 112-2 respectively. The firewalls 101-1 and 101-2 allow connections from terminals inside each of the user environments 102-1 and 102-2 to the internet 150, but deny connections from the internet 150 to terminals inside the user environments 102-1 and 102-2. Furthermore, the firewalls 111-1 and 111-2 allow connections from terminals inside each of the call centers 112-1 and 112-2 to the internet 150. However, connections from the internet 150 to the terminals inside the call centers 112-1 and 112-2 are denied.

A relay server group 121 is a server group including a server computer that provides a relay service via the internet 150, and the relay server may be a single machine or may be multiple machines. In FIG. 1, only a single relay server 120 is shown. Furthermore, the relay server group 121 may include an authentication function that carries out authentication of logins. In the first embodiment, authentication of the PCs 110-1 and 110-2 of the operators in the call centers 112-1 and 112-2 is carried out by an authentication function provided in the relay server 120.

It should be noted that in description hereafter, in cases where the user environments and the call centers are not specified, the MFPs 100-1 and 100-2 are given as MFP 100 and the PCs 110-1 and 110-2 are given as PC 110. Further still, the firewalls 101-1, 101-2, 111-1, and 111-2 are given as firewalls 101 and 111 respectively, the user environments 102-1 and 102-2 are given as user environment 102, and the call centers 112-1 and 112-2 are given as call center 112.

The MFP 100 and the PC 110 are provided with an HTTP (hypertext transfer protocol) based data communication function. HTTP is a client-server type protocol defined by RFC (request for comments) 2616 and has multiple methods. Generally, in a case where a client receives information from a server, the GET method is used, and in a case where information is sent from a client to a server, the POST method is used. In the first embodiment, communications between the MFP 100 and the PC 110 are achieved by using the GET method and the POST method.

That is, in a case where data such as video/audio and remote control information is to be sent from the PC 110 to the MFP 100, first the PC 110 sends a POST request for data to the relay server 120, and the relay server 120 buffers the data in a RAM 313 (FIG. 3) of the relay server 120. Then, when the MFP 100 sends a GET request to the relay server 120, the relay server 120 returns the data that is being buffered in the RAM 313 to the MFP 100 as a response.

On the other hand, in a case where data is to be sent from the MFP 100 to the PC 110, the MFP 100 sends a POST request for data to the relay server 120, and the relay server 120 buffers the data in the RAM 313. Then, when the PC 110 sends a GET request to the relay server 120, the relay server 120 sends the data that is being buffered in the RAM 313 to the PC 110 as a response. In this way, even in an environment in which the firewalls 101 and 111 are installed, a user of the MFP 100 is able to receive support using audio and video communications and remote control and the like from the operator of the call center 112. It should be noted that in the first embodiment, the various types of data sent and received between the PC 110 and the MFP 100 for the operator of the PC 110 to support the user of the MFP 100 is referred to as "support data." Here, when the MFP 100 and the PC 110 are to send a POST request or a GET request to the relay server 120, it is necessary to specify a common URL (uniform resource locator). This URL will be referred to as a "support URL" (access information). This support URL is generated by the relay server 120. Since the support URL is relay information necessary for the MFP 100 and the PC 110 to communicate via the relay server 120, the support URL must be common between an MFP 100 targeted for support and a PC 110 that is to carry out support.

A module that monitors the MFP 100 is incorporated into the MFP 100 itself. This module monitors the status of the MFP 100 and gives notification to a management server 130 of conditions of the MFP 100. The management server 130 is installed on the internet 150 and it obtains and manages information of the MFP 100 by carrying out communication with the monitoring module of the MFP 100 installed in each of the user environments 102-1 and 102-2. An MFP information table 131 holds information such as the basic usage status of the MFP and contract information with the user of the MFP, and it may be provided in the call center 112.

An authentication server 140 is a server that carries out authentication of the MFP 100. Upon authenticating that the MFP 100 is an authorized MFP, the authentication server 140 issues a device credential. Furthermore, the authentication server 140 carries out processes such as a process of registering the device credential in an MFP authentication management table 141 and a process of verifying whether or not the device credential is registered in the MFP authentication management table 141. The device credential and the body number, which is identification information that specifies the MFP, are stored associated together in the MFP authentication management table 141. Details of authentication are described later with reference to the flowcharts of FIG. 3, FIG. 5, and FIG. 8.

Figure 2:
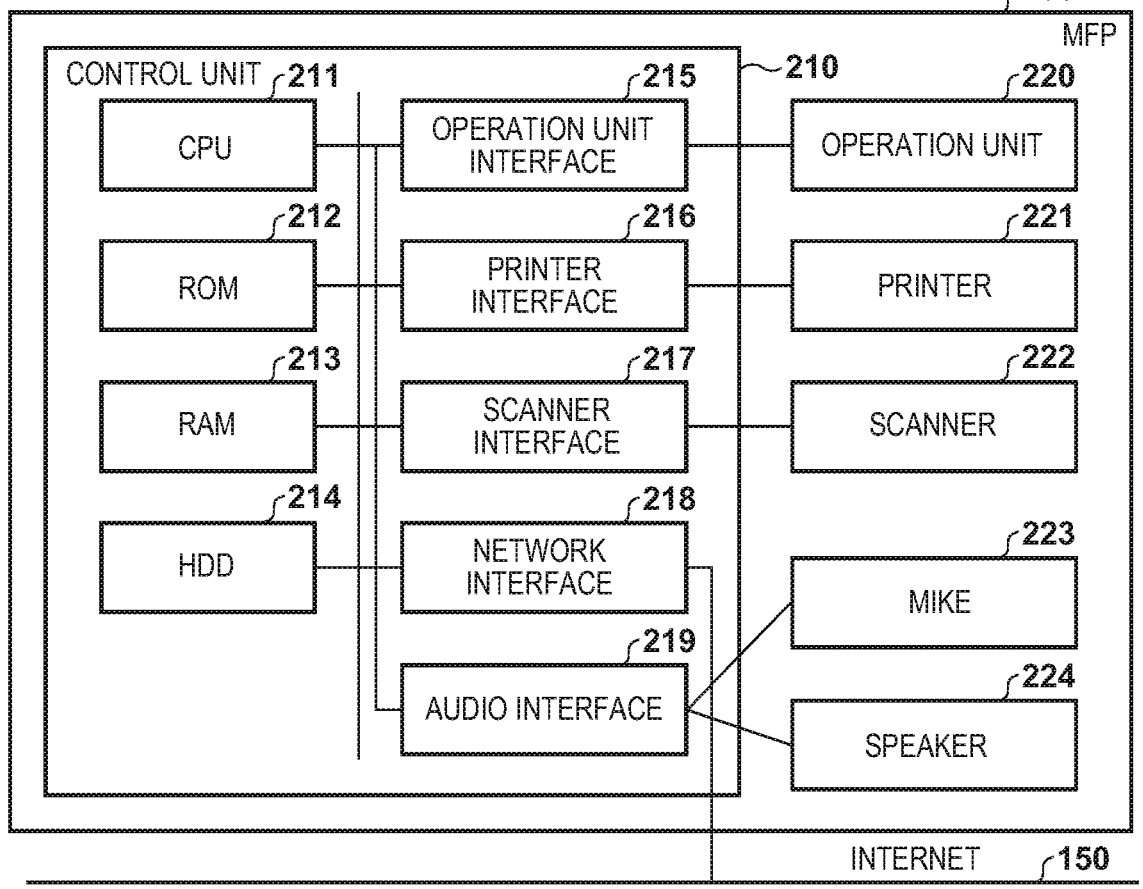
FIG. 2 is a block diagram showing a hardware configuration of an MFP according to the first embodiment of the present invention.

FIG. 2 is a block diagram showing a hardware configuration of the MFP 100 according to the first embodiment of the present invention.

A control unit 210 that includes a CPU 211 controls the overall operation of the MFP 100. The CPU 211 deploys in a RAM 213 a program that is stored an HDD 214 according to a boot program stored in a ROM 212, and by executing this carries out various types of control such as the reading and printing of originals and control of transmissions and the like. The RAM 213 is used as a temporary storage area for a main memory and work area or the like of the CPU 211. It should be noted that here it is given that the MFP 100 executes each process in a flowchart, which is described later, by having a single CPU 211 use a single memory (the RAM 213 or the HDD 214), but other embodiments may be used. For example, each of the processes shown in the flowchart to be described later may be executed by having multiple CPUs cooperate with multiple RAMs or HDDs. The HDD 214 stores image data and various programs. A console unit interface 215 connects a console unit 220 and the control unit 210. A display unit having a touch panel function and a keyboard or the like are provided in the console unit 220. A printer interface 216 connects a printer 221 and the control unit 210. Image data that is to be printed by the printer 221 is transferred from the control unit 210 to the printer 221 via the printer interface 216, then printed on a recording medium (sheet) in the printer 221. A scanner interface 217 connects a scanner 222 and the control unit 210. The scanner 222 generates image data by reading an image of an original then supplying that image data to the control unit 210 via the scanner interface 217. The image data (image file) that is generated by the scanner 222 can be sent as a file or sent via email by the MFP 100. A network interface 218 connects the MFP 100 to the internet 150. An audio interface 219 connects a microphone 223 and a speaker 224 to the control unit 210, and inputs audio signals that are inputted from the microphone 223 to the control unit 210. Furthermore, audio is produced by outputting the audio signals from the control unit 210 to the speaker 224. In an event of support to a user of the MFP 100 by an operator of the PC 110, the microphone 223 and the speaker 224 are used for conveying instructions from the operator to the user, and for conveying questions or the like from the user to the operator.

Figure 3:
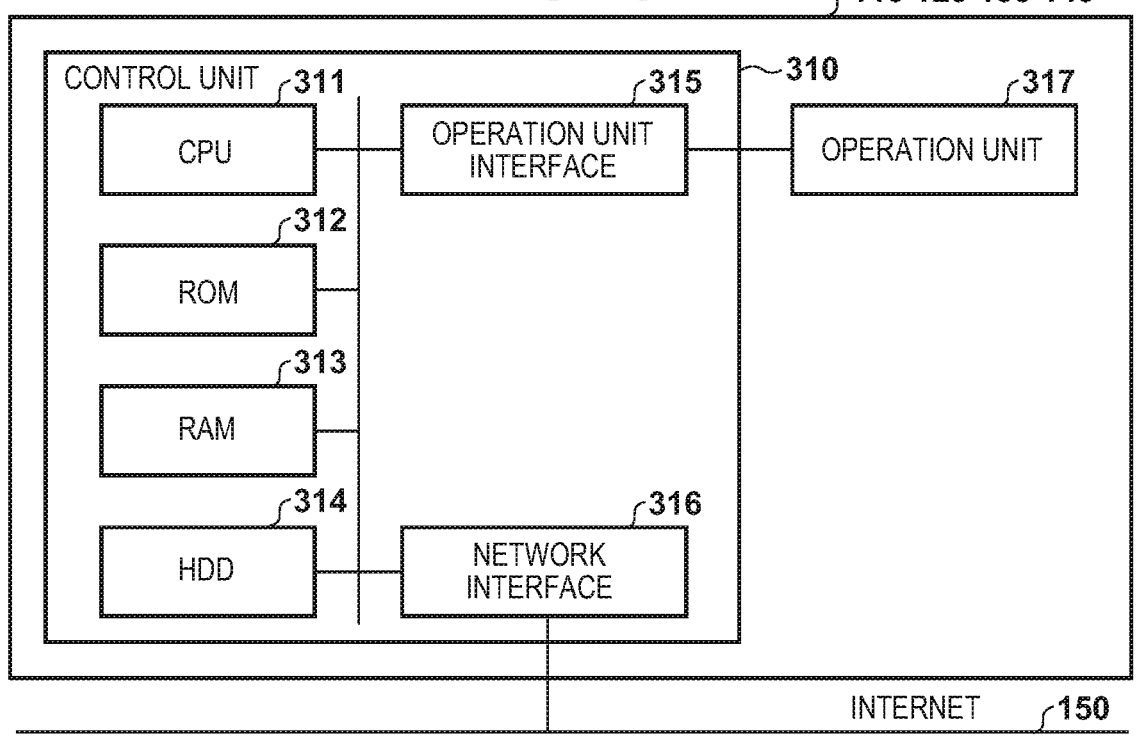
FIG. 3 is a block diagram showing a hardware configuration of a PC, a relay server, a management server, and an authentication server according to the first embodiment.

FIG. 3 is a block diagram showing a hardware configuration of the PC 110, the relay server 120, the management server 130, and the authentication server 140 according to the first embodiment. Here, since the PC 110, the relay server 120, the management server 130, and the authentication server 140 have configurations equivalent to that of an ordinary PC for example, description is given using FIG. 3 as a representative.

A control unit 310 that includes a CPU 311 controls the overall operation of that device. The CPU 311 executes a boot program stored in a ROM 312 and deploys in a RAM 313 a program that is stored an HDD 314, and executes various control processes by executing this program. The RAM 313 is used as a temporary storage area for a main memory and work area or the like of the CPU 311. The HDD 314 stores image data and various programs. An operation unit interface 315 connects an operation unit 317 and the control unit 310. A display unit having a touch panel function and a keyboard/pointing device and the like are provided in the operation unit 317. A network interface 316 controls communication between these and the internet 150.

Figure 4:
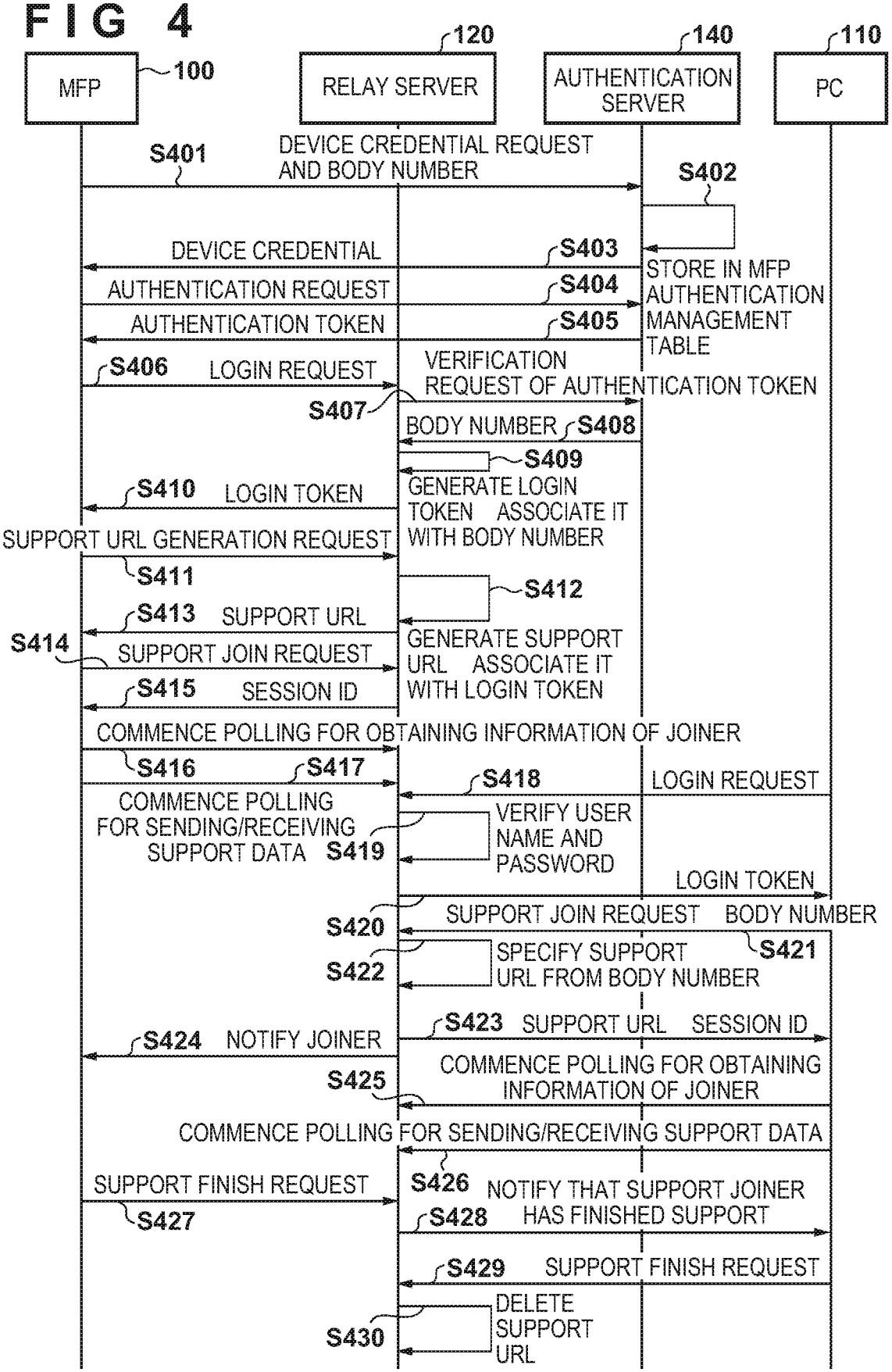
FIG. 4 is a sequence diagram for describing communication among the MFP, the PC, the relay server, and the authentication server according to the first embodiment.

FIG. 4 is a sequence diagram for describing communication among the MFP 100, the PC 110, the relay server 120, and the authentication server 140 according to the first embodiment. Operations shown in this sequence diagram are achieved by having the CPU 211 of the MFP 100 execute the program deployed in the RAM 213 from the HDD 214. Furthermore, processes of the PC 110, the relay server 120, and the authentication server 140 are achieved by having the CPU 311 in each device execute the program deployed in the RAM 313 from the HDD 314.

In a case where a problem has occurred in the MFP 100, prior to the execution of this sequence, the user of the MFP 100 telephones an operator at the call center 112. And the user of the MFP 100 conveys to the operator a description of the problem and the body number of the MFP 100. Generally, since a sheet of paper or a sticker on which the phone number of the call center and the body number of the MFP are listed is attached to the MFP, it is easy for the user of the MFP to know the phone number and the body number when contacting the call center. The operator who receives this contact then obtains information of the MFP 100 and the information of the contracted user from the management server 130 based on this body number. Then, in a case where the operator judges from the description of the query and the information obtained from the management server 130 that the problem can be solved by remote support, guidance is given to the user to commence remote support and this sequence commences.

At S401, when the user inputs a support commencement request via the console unit 220, the MFP 100 sends to the authentication server 140 a device credential request along with the body number. The device credential request includes authentication information for authenticating a user name, password, or a client certificate or the like of the MFP 100. At S402, the authentication server 140 verifies the received device credential request and, in a case where it is determined to be a genuine request, generates a device credential, associates it with the body number, and stores these in the MFP authentication management table 141. The device credential is authentication information such as an ID or a password for example. Then, at S403, the authentication server 140 sends the device credential that has been generated to the MFP 100.

At S404, the MFP 100 sends the received device credential to the authentication server 140 as an authentication request. In this way, the authentication server 140 references the received device credential against the MFP authentication management table 141, and if this is a correct device credential, it returns an authentication token to the MFP 100 at S405. The authentication token is unique data that certifies the MFP has been authenticated by the authentication server 140 as an authorized MFP, and it is used when the MFP 100 performs login and logout requests to the relay server 120. When the authentication token is issued, the authentication server 140 temporarily stores the authentication token associated with information indicating which MFP of the body number has been authenticated at that time by that authentication token. Thus, the MFP 100 is capable of obtaining an authentication token that enables a login to the relay server 120.

Next, at S406, the MFP 100 sends the received authentication token to the relay server 120 as a login request. In this way, at S407, the relay server 120 sends the authentication token received from the MFP 100 to the authentication server 140 as a verification request of the authentication token. Thus, the authentication server 140 verifies the received authentication token and, if it is a genuine authentication token that is stored, at S408 it returns the body number stored associated with that to the relay server 120 as an authentication result.

Next, at S409, the relay server 120 generates a login token (connection information) as a login result, and associates this with the received body number. This login token is unique data that certifies login to the relay server 120 is completed. Then, at S410, the authentication server 120 returns the generated login token to the MFP 100. In this way, the MFP 100 is capable of logging into the relay server 120.

Next, at S411, the MFP 100 sends the received login token to the relay server 120 as a support URL generation request. In this way, at S412, in a case where the received login token is verified and it is a genuine login token, the relay server 120 generates a support URL and stores the generated support URL in the RAM 313 associated with the login token. Here, since the login token is associated with the body number, a condition is achieved in which the support URL is also associated with the body number. Then, at S413, the relay server 120 returns the generated support URL to the MFP 100 as a response to the support URL generation request.

Next, at S414, along with the login token, the MFP 100 sends to the relay server 120 a join request for the support URL. Thus, at S415, the relay server 120 verifies the received login token and the support URL, and it returns a session ID to the MFP 100 as a response to the join request. The session ID is unique data that certifies joining to the support URL, and it is used when carrying out the sending and receiving of data with the support URL of the relay server 120. At S416, in response to the received support URL, the MFP 100 commences polling for obtaining information of the joiner to the relay server 120. And at S417, in response to the received support URL, the MFP 100 commences polling for sending and receiving support data to the relay server 120. In this way, a condition is achieved in which data exchanges are possible between the MFP 100 and the relay server 120.

Next, at S418, the PC 110 of the call center issues a login request to the relay server 120 to carry out a connection. At this time, the PC 110 sends the user name and password as the login request. In this way, at S419, the relay server 120 verifies the user name and password, and if the verification result is affirmative, the relay server 120 returns a login token to the PC 110 at S420. In response to this, at S421, the PC 110 sends the received login token along with the body number to the relay server 120 as a support join request. Here, as described earlier, the body number to be sent is the body number of the MFP 100 conveyed by the user of the MFP 100 to the operator prior to execution of this sequence. In this way, at S422, if the received login token is verified and is a correct login token, the relay server 120 specifies the support URL from the received body number. And at S423, the relay server 120 returns the specified support URL and the session ID to the PC 110. Furthermore, at S424, the relay server 120 carries out notification of the joiner in response to the polling for obtaining information of the joiner of the MFP 100. Next, at S425, in response to the received support URL, the PC 110 commences polling for obtaining joiner information to the relay server 120, and further still, at S426, in response to the received support URL, the PC 110 commences polling for sending and receiving support data to the relay server 120. In this way, a condition is achieved in which data exchanges are possible between the PC 110 and the relay server 120. And a condition is achieved in which both the MFP 100 and the PC 110 have commenced polling to the relay server 120.

At this time, upon receiving POST polling of support data to the support URL from the MFP 100 or PC 110, the relay server 120 buffers the support data in the RAM 313 of the relay server 120. Examples of support data include, for example, video/audio, remote control command data, and information held by the MFP 100. It should be noted that information held by the MFP 100 may be, for example, a counter value, an operation log, operation information such as component counter values indicating a level of depletion of various components used in the MFP 100, and failure information such as hardware malfunctions and jams or the like. On the other hand, upon undergoing GET polling from the MFP 100 or the PC 110 to the support URL, the relay server 120 returns the support data that is buffered in the RAM 313 of the relay server 120 to the MFP 100 or the PC 110. It should be noted that multiple support URLs may exist at this time and in this case a buffering region of the RAM 313 of the relay server 120 is assigned for each support URL. In this manner, the MFP 100 and the PC 110 carry out sending and receiving of support data by way of the relay server 120. In this way, a user of the MFP 100 is able to receive support using audio and video communications and remote control and the like from the operator of the PC 110.

And in an event of the MFP 100 finishing support, at S427, the MFP 100 sends to the relay server 120 a support finish request for the support URL along with the session ID. In this way, the MFP 100 finishes communication with the relay server 120. Upon receiving the support finish request, at S428, the relay server 120 notifies the PC 110 that the support joiner has finished support. Thus, at S429, since support is to be finished, the PC 110 sends to the relay server 120 the support finish request for the support URL along with the session ID. In this way, the PC 110 finishes communication with the relay server 120. And at S430, the relay server 120 deletes the support URL in the RAM 313. It should be noted that in the first embodiment the support finish request was sent from the MFP 100 to the relay server 120, but it is also possible for the support finish request to be sent first from the PC 110 to the relay server 120.

It should be noted that in the first embodiment authentication of the MFP 100 was carried out by the authentication server 140 and authentication of the PC 110 was carried out by the relay server 120, but the MFP 100 may be authenticated by the relay server 120 along with the PC 110. In this case, in the event of the login request of the MFP 100 at S406, authentication information such as the client certificate or the user name and password or the like, and the body number are sent to the relay server 120. And if the relay server 120 verifies the authentication information and the verification result is affirmative, then at S409, the generation of the login token and the associating with the body number may be carried out.

FIG. 5 is a flowchart for describing processing executed by the MFP 100 according to the first embodiment. It should be noted that each operation (step) shown in the flowchart is achieved by having the CPU 211 of the MFP 100 deploy a program stored in the HDD 214 in the RAM 213 and execute the deployed program in the RAM 213.

First, in step S501, the CPU 211 detects that a specific hardware key on the console unit 220 of the MFP 100 has been long-pressed to instruct commencement of remote maintenance service. It should be noted that in the first embodiment, a long-press of a hardware key on the console unit 220 is given as the trigger for commencement of remote maintenance service, but it is also possible for this to be the pressing of a button displayed on the console unit 220 or the pressing of a special-purpose hardware key on the console unit 220. Or the trigger may also be a specific sequence in which hardware keys on the console unit 220 are operated or the like. The CPU 211 proceeds to step S502 upon commencement of remote maintenance service being instructed in step S501, and the CPU 211 displays on the console unit 220 a confirmation screen for confirming with the user that it is OK to connect to the relay server 120 for commencement of remote maintenance service. Then, in step S503, the CPU 211 determines whether or not a pressing of an agree button on the confirmation screen has been detected, and finishes processing in a case where there is no agreement, but when the agree button has been pressed, the procedure proceeds to step S504. In step S504, the CPU 211 determines whether or not the MFP 100 stores a device credential issued from the authentication server 140 in the HDD 214. Here, processing proceeds to step S508 when it is determined this is stored, but when this is not the case, the procedure proceeds to step S505 and the CPU 211 sends a device credential request to the authentication server 140 (S401). At this time the CPU 211 sends to the authentication server 140 the body number of the MFP 100 along with authentication information indicating that the MFP 100 is an authorized MFP. This authentication information is a client certificate for example, or a user name and password. In a case where the authentication information sent in step S505 is genuine, in step S506 the CPU 211 receives the device credential from the authentication server 140 (S403). The device credential is authentication information known only to that MFP 100, such as a user name and password for example. Next, the procedure proceeds to step S507 and the CPU 211 stores in the HDD 214 the device credential received in step S506, and the procedure proceeds to step S508.

In step S508, the CPU 211 sends the stored device credential to the authentication server 140 as a device authentication request (S404). Next, the procedure proceeds to step S509 and the CPU 211 receives an authentication token from the authentication server 140 as a result of the device authentication request (S405). And in step S510, the CPU 211 sends the authentication token to the relay server 120 as a request to login to the relay server 120 (S406). Next, in step S511, the CPU 211 receives a login token from the relay server 120 as a response corresponding to the login request (S410), and in step S512 the CPU 211 stores the received login token in the RAM 213.

Next, the procedure proceeds to step S513 and the CPU 211 sends the login token to the relay server 120 as a support URL generation request (S411). And in step S514, the CPU 211 receives from the relay server 120 a generated support URL as a response to the support URL generation request (S413). Then the procedure proceeds to step S515 and the CPU 211 sends a support join request for the received support URL to the relay server 120 along with the login token (S414). Next, the procedure proceeds to step S516 and when the CPU 211 receives a session ID from the relay server 120 as a response to the support join request (S415), the CPU 211 stores the received session ID in the RAM 213 in step S517.

Next, the procedure proceeds to step S518 and the CPU 211 commences polling for obtaining joiner information to the relay server 120 (S416). And in step S519, the CPU 211 commences polling for sending and receiving support data to the relay server 120 (S417). In the polling in step S518 and step S519, the CPU 211 assigns the session ID stored in the RAM 213 and sends it to the relay server 120. And when the PC 110 performs a support join to the relay server 120

(S421), the CPU 211, in step S520, receives a notification of the joiner as obtainment information of obtain polling of joiner information to the relay server 120 (S424). In this way, the MFP 100 achieves a state in which remote support by the PC 110 has commenced.

And in the event of support to the MFP 100 by the PC 110 being finished, the CPU 211, in step S521, assigns the session ID stored in the RAM 213 to the relay server 120 and sends a support finish request to the relay server 120. And in step S522, the CPU 211 deletes the session ID stored in the RAM 213. Next, the procedure proceeds to step S523 and the CPU 211 assigns the login token stored in the RAM 213 and sends a logout request to the relay server 120. And in step S524, the CPU 211 deletes the login token stored in the RAM 213 and finishes the procedure.

In this manner, the MFP is able to carry out exchanges of information between itself and the PC of the call center via the support URL generated by the relay server.

FIG. 6 is a flowchart for describing processing executed by the PC 110 according to the first embodiment. It should be noted that each operation (step) shown in the flowchart is achieved by having the CPU 311 of the PC 110 deploy a program stored in the HDD 314 in the RAM 313 and execute the deployed program in the RAM 313.

First, in step S601, the CPU 311 issues a login request to the relay server 120 (S418). This login request includes authentication information, and the authentication information is a user name and password inputted to the PC 110 for example. Next, the procedure proceeds to step S602 and when the CPU 311 receives a login token from the relay server 120 as a response to the login request (S420), the procedure proceeds to step S603 and the CPU 311 stores the login token received from the relay server 120 in the HDD 314.

Next, the procedure proceeds to step S604 and the CPU 311 sends a support join request and the body number to the relay server 120 (S421). Here, the body number is the number conveyed by the user of the MFP 100 when calling the call center 112, and it is information that the operator of the call center 112 has inputted via the operation unit 317 of the PC 110. Here, in a case where there is a mistake with the body number, a response is given of a failure of the support join request from the relay server 120, and the body number must be re-inputted. In a case where the support join is successful, in step S605 the CPU 311 receives a support URL and a session ID from the relay server 120 (S423). And in step S606 the CPU 311 stores the received session ID in the RAM 313.

Next, the procedure proceeds to step S607 and the CPU 311 commences polling for obtaining joiner information to the relay server 120 (S425). In step S608, the CPU 311 commences polling for sending and receiving support data to the relay server 120 (S426). In the polling in step S607 and step S608, the CPU 311 assigns the session ID stored in the RAM 313 and sends it to the relay server 120. In this way, the PC 110 achieves a state in which remote support has commenced. In step S609, when another joiner finishes support, the CPU 311 receives notification of support completion of the support joiner according to polling for obtaining support joiner information (S428).

In the event of the PC 110 finishing support, in step S610 the CPU 311 assigns the session ID stored in the RAM 313 and sends a support finish notification to the relay server 120. Then the procedure proceeds to step S611 and the CPU 311 deletes the session ID stored in the RAM 313. Next, the procedure proceeds to step S612 and the CPU 311 sends the login token and a logout request to the relay server 120, and in step S613, the CPU 311 deletes the login token stored in the RAM 313, and this process finishes.

In this manner, the operator of the call center PC is able to carry out operational support of the MFP in the user environment via the support URL generated by the relay server.

FIGS. 7A and 7B are flowcharts for describing processing executed by the relay server 120 according to the first embodiment. It should be noted that each operation (step) shown in the flowcharts is achieved by having the CPU 311 of the relay server 120 deploy a program stored in the HDD 314 in the RAM 313 and execute the deployed program in the RAM 313.

First, in step S701 the CPU 311 receives a login request from the MFP 100 along with an authentication token (S406). Next, the procedure proceeds to step S702 and the CPU 311 sends an authentication token verification request to the authentication server 140 in order to verify whether or not the received authentication token is one that has been issued by the authentication server 140 (S407). Here, in a case where the verification result of the authentication token is affirmative, the CPU 311, in step S703, receives the body number from authentication server 140 (S406). This body number is the same as the body number of the MFP 100. And the procedure proceeds to step S704 and the CPU 311 generates a login token and, in step S705, the CPU 311 associates and stores the body number received in step S703 and the login token generated in step S704 (S409). Next, the procedure proceeds to step S706 and the CPU 311 sends the login token to the MFP 100 (S410).

Next, in step S707, the CPU 311 receives a support URL generation request and the login token from the MFP 100 (S411). Next, the procedure proceeds to step S708 and the CPU 311 determines whether or not the login token received in step S707 matches the stored login token, and if the login tokens do match, the procedure proceeds to step S709 and the CPU 311 generates a support URL. Here, since the login token is associated with the body number of the MFP 100, a condition is achieved in which the support URL is also associated with the body number. And the procedure proceeds to step S710 and the CPU 311 associates and stores the support URL generated in step S709 and the login token received in step S707 (S412). In this way, since the login token is associated with the body number of the MFP 100, a condition is achieved in which the support URL is also associated with the body number. And the procedure proceeds to step S711 and the CPU 311 sends to the MFP 100 the support URL generated in step S709 (S413). And the procedure proceeds to step S712 and the CPU 311 receives from the MFP 100 a request to join the support URL and the login token (S414). Next, in step S713, the CPU 311 verifies the login token and when the verification is successful, the procedure proceeds to step S714 and the CPU 311 generates a session ID. And the procedure proceeds to step S715 and the CPU 311 sends to the MFP 100 the session ID (S415). In this way, henceforth, the session ID is assigned in the event of polling for obtaining joiner information to the session ID and polling for sending and receiving support data by the MFP 100, and the CPU 311 of the relay server 120 carries out verification of the received session ID.

Next, the procedure proceeds to step S716 and when the CPU 311 receives commencement of polling for obtaining joiner information from the MFP 100 (S416), the procedure proceeds to step S717 and the CPU 311 receives commencement of polling for the sending and receiving of support data from the MFP 100 (S417). In this way, a condition is achieved in which data exchanges are possible between the MFP 100 and the relay server 120.

Next, the procedure proceeds to step S718 and when the CPU 311 receives a user name and password as a login request from the PC 110 (S418), the procedure proceeds to step S719 and the CPU 311 carries out verification of the received user name and password. Here, when the verification is successful, the procedure proceeds to step S720 and the CPU 311 sends the login token to the PC 110 (S420).

Next, in step S721, when the CPU 311 receives the support join request and the body number from the PC 110 (S421), the procedure proceeds to step S722 and the CPU 311 verifies the received login token. Here, when this is verified successfully, the procedure proceeds to step S723 and the CPU 311 specifies the support URL that is being stored based on the received body number (S422). And the procedure proceeds to step S724 and the CPU 311 generates a session ID as a join result to the support URL, after which the procedure proceeds to step S725 and the CPU 311 sends the support URL and the generated session ID to the PC 110 (S423). In this way, henceforth, the session ID is assigned in the event of polling for obtaining joiner information to the session ID and polling for sending and receiving support data by the PC 110, and the CPU 311 of the relay server 120 carries out verification of the received session ID. Furthermore, in step S726, the CPU 311 sends to the MFP 100 that is already joined to the support URL a notification of that the PC 110 has been added as a joiner (S424).

Next, the procedure proceeds to step S727 and the CPU 311 receives commencement of polling for obtaining joiner information from the PC 110. And the procedure proceeds to step S728 and the CPU 311 receives commencement of polling for the sending and receiving of support data from the PC 110. In this way, a condition is achieved in which data exchanges are possible between the PC 110 and the relay server 120.

Next, the procedure proceeds to step S729 and communication of polling for join information between the MFP 100 and the PC 110 is relayed by the CPU 311 between the MFP 100 and the PC 110. And the procedure proceeds to step S730 and communication of polling for support data between the MFP 100 and the PC 110 is relayed by the CPU 311 between the MFP 100 and the PC 110. In this manner, the mutual sending and receiving of data between the MFP 100 and the PC 110 is enabled via the relay server 120.

And in the event of support finishing, in step S731 the CPU 311 of the relay server 120 determines whether or not a support finish request has been received from the MFP 100 for the support URL. The session ID is assigned in this support finish request. When a support finish request is not received in step S731, the procedure proceeds to step S739 and the CPU 311 carries out a process of determining whether or not a support finish request has been received from the PC 110. When it is determined in step S731 that the support finish request (S427) has been received, the procedure proceeds to step S732 and the CPU 311 deletes the stored session ID, which is the same value as the received session ID. In this way, the MFP 100 is no longer among the joiners to the support URL.

Next, the procedure proceeds to step S733 and the CPU 311 determines whether or not the PC 110 is currently joined to support at the support URL, and when it is determined that the PC 110 is currently joined to support, the procedure proceeds to step S734 and the CPU 311 sends a notification (S428) to the PC 110 that the support joiner has finished support, and the procedure proceeds to step S735. On the other hand, when it is determined in step S733 that the PC 110 is not currently joined to support, the procedure proceeds to step S735. In step S735, when the CPU 311 receives a logout request and login token from the MFP 100, the procedure proceeds to step S736 and the CPU 311 verifies the received login token. Here, when the verification is successful, the procedure proceeds to step S737 and the CPU 311 deletes the stored login token and body number, and the procedure proceeds to step S738. In step S738, the CPU 311 determines whether or not there is a support joiner at the support URL, and when it is determined that there is no support joiner, the procedure proceeds to step S742 and when it is determined that the support joiner present, the procedure proceeds to step S739.

In step S739, the CPU 311 determines whether or not a support finish request has been received from the PC 110 for the support URL. The session ID is assigned in this support finish request. When the CPU 311 determines in step S739 that the support finish request has been received, the procedure proceeds to step S740 and the CPU 311 deletes the stored session ID, which is the same value as the received session ID, and the procedure proceeds to step S741. In this way, the PC 110 is no longer among the joiners to the support URL. On the other hand, when it is determined in step S739 that the support finish request has not been received, the procedure proceeds to step S729.

In step S741, the CPU 311 determines whether or not there is a support joiner at the support URL, and when it is determined that there is the support joiner, the procedure returns to step S729 and continues support. On the other hand, in a case where it is determined in step S741 that there is no support joiner, the procedure proceeds to step S742 and the support URL is deleted. Next, the procedure proceeds to step S743 and when the CPU 311 receives a logout request from the PC 110, the procedure proceeds to step S744 and the CPU 311 verifies the received login token. And when the verification is successful, the procedure proceeds to step S745 and the CPU 311 deletes the stored login token, thereby finishing this procedure.

In this manner, the relay server relays mutually authenticated data exchanges between the PC and the MFP, thereby enabling remote support of the MFP by the PC to be executed.

Figure 8:
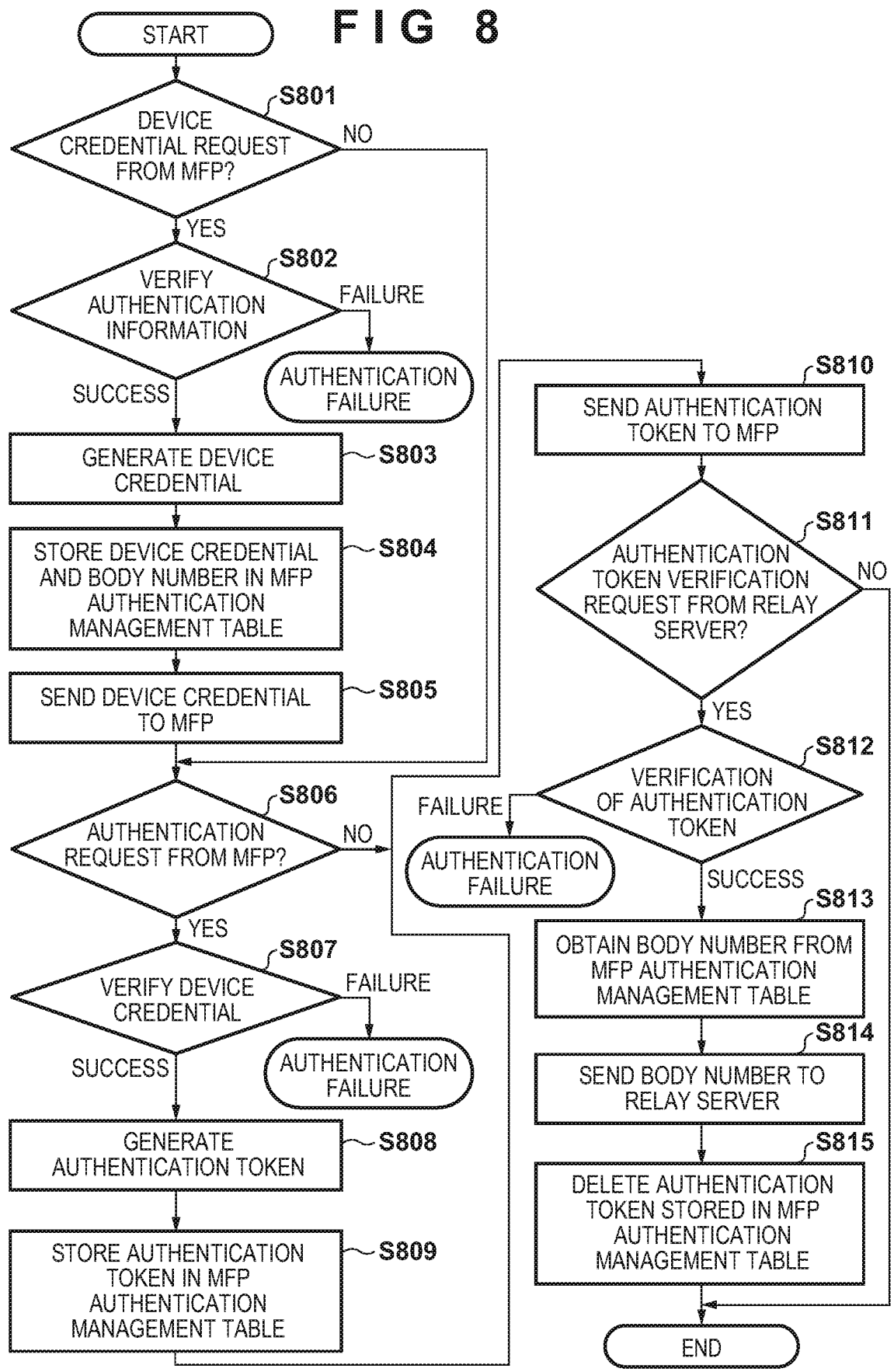
FIG. 8 is a flowchart for describing processing executed by the authentication server according to the first embodiment.

FIG. 8 is a flowchart for describing processing executed by the authentication server 140 according to the first embodiment. It should be noted that each operation (step) shown in the flowchart is achieved by having the CPU 311 of the authentication server 140 deploy a program stored in the HDD 314 in the RAM 313 and execute the deployed program in the RAM 313.

First, in step S801, the CPU 311 determines whether or not a device credential request (S401) has been received from the MFP 100. When it is determined here that the device credential request has not been received, the procedure proceeds to step S806, but if this is not the case, the procedure proceeds to step S802. It should be noted that the device credential request includes authentication information and the body number of the MFP 100. The authentication information is a client certificate for example, or a user name and password. In step S802, the CPU 311 verifies the received authentication information, and when it is determined as a result of the verification that this is an incorrect request, this procedure finishes as an authentication failure. On the other hand, in a case where the verification result is that the request is genuine, the procedure proceeds to step S803 and the CPU 311 generates a device credential and the procedure proceeds to step S804. The device credential is unique information for authenticating the device, such as a user name and password for example. In step S804, the CPU 311 stores the generated device credential in the MFP authentication management table 141 associated with the body number of the MFP. It should be noted that in a case where a password is used in the device credential, rather than storing the password as it is, a hash value obtained uniquely from that password may be stored. Then the procedure proceeds to step S805 and the CPU 311 sends the device credential to the MFP 100 as a response to the device credential request (S403).

Next, the procedure proceeds to step S806 and the CPU 311 determines whether or not an authentication request (S404) has been received from the MFP 100. When it is determined here that the authentication request has not been received, the procedure proceeds to step S811, and when the authentication request is received, the procedure proceeds to step S807. It should be noted that the authentication request includes the device credential. In step S807, the CPU 311 verifies the received device credential, and when it is determined as a result of the verification that it is an incorrect request, the procedure finishes as an authentication failure. On the other hand, in a case where the authentication is successful and it is determined to be a genuine request, the procedure proceeds to step S808 and the CPU 311 generates an authentication token. Then the procedure proceeds to step S809 and the CPU 311 stores the authentication token in the MFP authentication management table 141 associated with the received device credential. Next, the procedure proceeds to step S810 and the CPU 311 sends (S405) the authentication token to the MFP 100 and the procedure proceeds to step S811.

In step S811, the CPU 311 determines whether or not a verification request of the authentication token has been received from the relay server 120 (S407), and in a case where it is not received, the procedure finishes, but when the verification request has been received, the procedure proceeds to step S812. In step S812, the CPU 311 verifies the authentication token, and when it is determined as a result of the verification that it is an incorrect request, the procedure finishes as an authentication failure. On the other hand, in a case where in step S812 the CPU 311 determines that it is a genuine request, the procedure proceeds to step S813 and the CPU 311 obtains the body number associated with the authentication token stored in step S809 from the MFP authentication management table 141. And the procedure proceeds to step S814 and the CPU 311 sends the body number to the relay server 120 (S408). After this, the procedure proceeds to step S815 and the CPU 311 deletes the authentication token stored in the MFP authentication management table 141. Furthermore, since there are cases where the authentication processing is not executed, the authentication token is deleted after a certain time has elapsed.

According to the above-described first embodiment, by having the user conveyed the body number of the MFP to the operator of the PC of the call center, the call center PC can join the support URL associated with the body number in the relay server. In this way, the operator of the PC can carry out remote maintenance service of the MFP via the relay server.

Second Embodiment

Next, description is given regarding a second embodiment of the present invention. In the above-described first embodiment, in the event of the MFP 100 performing a support join to the relay server 120, the relay server 120 generates a support URL and the body number was inputted in order for the relay server 120 to specify the MFP 100. In general, in the event of a user of the MFP telephoning the call center, operations are conducted by having the body number of the MFP conveyed, but operations are conceivable in which the body number is not conveyed such as in cases where the MFP is not managed by the management server 130. For cases such as these, description is given using an example in which the operator of the call center inputs a receipt number rather than the body number. It should be noted that the configuration of the system according to the second embodiment and the hardware configuration of the MFP, the PC, the relay server, the management server, and the authentication server are equivalent to the above-described first embodiment, and therefore description thereof is omitted.

FIG. 9 is a flowchart for describing processing executed by the MFP 100 according to the second embodiment. It should be noted that each operation shown in the flowchart is achieved by having the CPU 211 of the MFP 100 deploy a program stored in the HDD 214 in the RAM 213 and execute the program in the RAM 213. It should also be noted that in the flowchart of FIG. 9, same processes as in FIG. 5 of the above-described first embodiment are indicated using same reference symbols and description thereof is omitted.

In step S901, the CPU 211 sends a device credential request to the authentication server 140. At this time the CPU 211 sends to the authentication server 140 authentication information indicating that the MFP 100 is an authorized MFP.

In step S902, the CPU 211 receives a session ID and a receipt number from the relay server 120 as a result of the support join request. Next, in step S903 the CPU 211 stores the received session ID in the RAM 213. And in step S904 the CPU 211 displays the received receipt number on the display unit of the console unit 220 of the MFP 100. In this manner, the user of the MFP 100 conveys to the operator of the call center the receipt number displayed on the console unit 220 of the MFP 100.

In this manner, in a case where the body number of the MFP cannot be obtained, the PC of the call center is able to specify the MFP targeted for support based on the session ID from the relay server 120 and the receipt number that is received.

Figure 10:
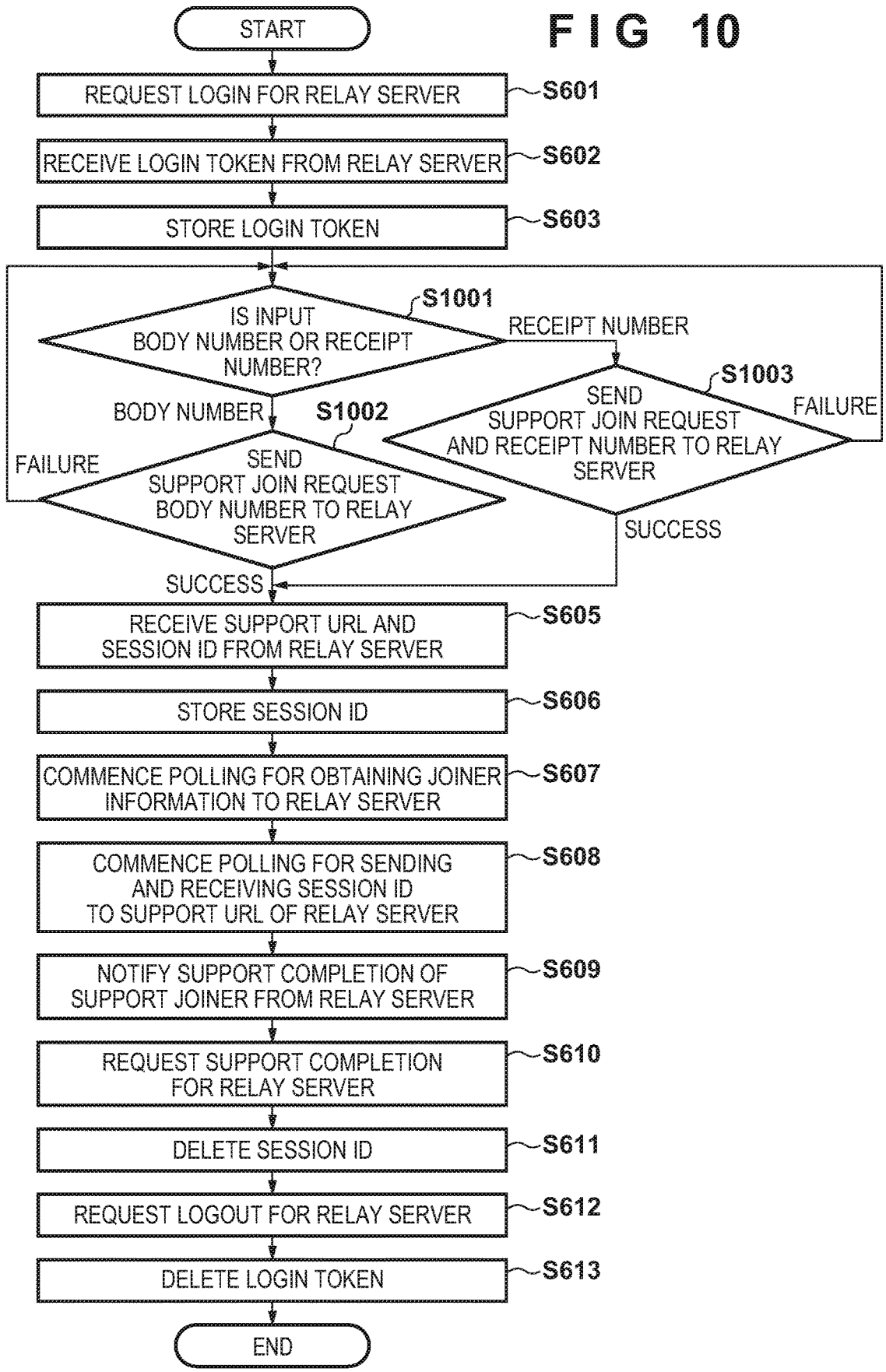
FIG. 10 is a flowchart for describing processing executed by the PC according to the second embodiment.

FIG. 10 is a flowchart for describing processing executed by the PC 110 according to the second embodiment. It should be noted that each operation (step) shown in the flowchart is achieved by having the CPU 311 of the PC 110 deploy a program stored in the HDD 314 in the RAM 313 and execute the deployed program in the RAM 313. It should also be noted that in this flowchart, processes that are common to those in FIG. 6 of the above-described first embodiment are indicated using same reference symbols and description thereof is omitted.

In step S1001, the CPU 311 determines whether or not a body number has been inputted from the operation unit 317 or whether or not a receipt number has been inputted. This input is carried out by operation of a keyboard of the operation unit 317 of the PC 110 for example. When it has been determined in step S1001 that the body number has been inputted, the procedure proceeds to step S1002 and the CPU 311 sends a support join request and the body number to the relay server 120. Here, when the sending is successful, the procedure proceeds to step S605, but in a case where the sending has failed, the procedure proceeds to step S1001.

Furthermore, in a case where it has been determined by the CPU 311 in step S1001 that the receipt number has been inputted, the procedure proceeds to step S1003 and the CPU 311 sends a support join request and the receipt number to the relay server 120. Here, in a case where there is a mistake in the receipt number and the sending has failed, the procedure proceeds to step S1001, but when the sending has been successful, the procedure proceeds to step S605. Thus, either the body number or the receipt number is inputted and sent along with the support join request.

In this manner, the PC of the call center uses either the body number of the MFP or the receipt number of the request from the MFP generated by the relay server, and it is able to specify the MFP to be supported.

FIGS. 11A and 11B are flowcharts for describing processing executed by the relay server 120 according to the second embodiment. It should be noted that each operation (step) shown in the flowcharts is achieved by having the CPU 311 of the relay server 120 deploy a program stored in the HDD 314 in the RAM 313 and execute the deployed program in the RAM 313. It should also be noted that in FIGS. 11A and 11B, processes that are common to the processes in the above-described FIGS. 7A and 7B are indicated using same reference numbers and description thereof is omitted.

In step S1101, the CPU 311 generates a receipt number that corresponds one-to-one with the support URL. It should be noted that in the second embodiment the receipt number may be numerals and may be characters. In order to reduce the risk of another receipt number adversely matching in a case where a mistaken receipt number is inputted due to an inadvertent operation, random numerals may be used. Next, the procedure proceeds to step S1102 and the CPU 311 associates and stores the support URL, the receipt number, and a login token.

In step S1103, the CPU 311 reads in the receipt number that has been stored associated with the received login token. And the procedure proceeds to step S1104 and the CPU 311 sends a session ID and the receipt number to the MFP 100.

Further still, when the CPU 311 receives the support join request from the PC 110 in step S1105, the procedure proceeds to step S1106. The support join request includes the login token and either the body number or the receipt number. In step S1106, the CPU 311 verifies the received login token and if the result of the verification is affirmative, then the procedure proceeds to step S1107 and the CPU 311 determines whether the data received in step S1105 is the body number or the receipt number. Here, when it is determined to be the body number, the procedure proceeds to step S1108 and the CPU 311 specifies the stored support URL from the body number, and the procedure proceeds to step S724. On the other hand, when it is determined to be the receipt number, the procedure proceeds to step S1109 and the CPU 311 specifies the stored support URL from the receipt number, and the procedure proceeds to step S724. Then, in step S1110, the CPU 311 deletes the support URL and the receipt number and the procedure proceeds to step S743.

Since there is no difference to the first embodiment in regard to the operations of the authentication server 140, description thereof is omitted.

According to the second embodiment as described above, the PC arbitrarily inputs either the body number of the MFP or the receipt number to the relay server, thereby enabling joining to the support URL and enabling remote maintenance service of the MFP to be carried out via the relay server.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disc (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-161371, filed Aug. 24, 2017, which is hereby incorporated by reference herein in its entirety.

What is claimed is:

1. A communication system having a first terminal and a second terminal, and a relay server that relays communication between the first terminal and the second terminal,
   wherein the relay server includes:
   a first memory device that stores a set of instructions; and
   a first processor that executes the instructions to:
      in a case where a login request is received including first authentication information from the first terminal, associate and store, in a storage, identification information of the first terminal corresponding to the first authentication information and access information for accessing the relay server;
      send the access information to the first terminal;
      in a case where a login request has been received including second authentication information from the second terminal, send to the second terminal the access information which is specified based on the identification information of the first terminal which is sent from the second terminal and the identification information stored in the storage; and
      relay communication to be carried out between the first and the second terminals based on the access information,
   wherein the system further comprises an authentication server that authenticates the first terminal,
   wherein the authentication server includes:
   a second memory device that stores a set of instructions; and
   a second processor that executes the instructions to:

associate and store a credential of the first terminal and the identification information of the first terminal in response to a credential request from the first terminal; and send the first authentication information of the first terminal to the first terminal in response to an authentication request from the first terminal, and wherein the second processor executes the instructions further to, send the identification information of the first terminal to the relay server in response to a verification request of the first authentication information of the first terminal from the relay server.

2. The communication system according to claim 1, wherein the first processor executes the instructions further to, generate a receipt number of the request in response to a login request including the first authentication information from the first terminal, wherein the first processor sends the access information to the second terminal based on a login request including the second authentication information from the second terminal and the identification information of the first terminal from the second terminal or the receipt number.

3. The communication system according to claim 1, wherein the first processor executes the instructions further to associate and store the identification information of the first terminal and the access information, wherein the first processor specifies the access information that is stored based on the identification information of the first terminal from the second terminal and sends the access information to the second terminal.

4. The communication system according to claim 1, wherein the identification information is a body number of the first terminal.

5. A system comprising a relay server that relays communications between a first terminal and a second terminal, including:

a memory device that stores a set of instructions; and at least one processor that executes the instructions to:

in a case where a login request is received including first authentication information from the first terminal, associate and store, in a storage, identification information of the first terminal corresponding to the first authentication information and access information for accessing the relay server;

send the access information to the first terminal;

in a case where a login request has been received including second authentication information from the second terminal, send to the second terminal the access information which is specified based on the identification information of the first terminal which is sent from the second terminal and the identification information stored in the storage; and relay communication to be carried out between the first and the second terminals based on the access information, wherein the system further comprises an authentication server that authenticates the first terminal, wherein the authentication server includes:

a second memory device that stores a set of instructions; and a second processor that executes the instructions to:

associate and store a credential of the first terminal and the identification information of the first terminal in response to a credential request from the first terminal; and send the first authentication information of the first terminal to the first terminal in response to an authentication request from the first terminal, and wherein the second processor executes the instructions further to, send the identification information of the first terminal to the relay server in response to a verification request of the first authentication information of the first terminal from the relay server.

6. The relay server according to claim 5, wherein the at least one processor executes the instructions further to associate and store the identification information of the first terminal and the access information, wherein the at least one processor specifies the access information that is stored based on the identification information of the first terminal from the second terminal and sends the access information to the second terminal.

7. The relay server according to claim 5, wherein the at least one processor executes the instructions further to generate a receipt number of the request in response to a login request including the first authentication information from the first terminal, wherein the at least one processor sends the access information to the second terminal based on a login request including the second authentication information from the second terminal and the identification information of the first terminal from the second terminal or the receipt number.

8. A method of controlling a communication system having a first terminal and a second terminal, and a relay server that relays communication between the first terminal and the second terminal, the method comprising:

with the relay server, in a case where a login request is received including first authentication information from the first terminal, associating and storing, in a storage, identification information of the first terminal corresponding to the first authentication information and access information for accessing the relay server;

sending the access information to the first terminal;

with the relay server, in a case where a login request has been received including second authentication information from the second terminal, sending to the second terminal the access information which is specified based on the identification information of the first terminal which is sent from the second terminal and the identification information stored in the storage, and with the relay server, relaying communication to be carried out between the first and the second terminals based on the access information, wherein the communication system also has an authentication server that authenticates the first terminal, and the method further comprises with the authentication server associating and storing a credential of the first terminal and the identification information of the first terminal in response to a credential request from the first terminal; and sending the first authentication information of the first terminal to the first terminal in response to an authentication request from the first terminal, and sending the identification information of the first terminal to the relay server in response to a verification request of the first authentication information of the first terminal from the relay server.

9. A method of controlling a system comprising a relay server that relays communications between a first terminal and a second terminal, the method comprising:

in a case where a login request is received including first authentication information from the first terminal, associating and storing, in a storage, identification information of the first terminal corresponding to the first authentication information and access information for accessing the relay server;

sending the access information to the first terminal;

in a case where a login request has been received including second authentication information from the second terminal, sending to the second terminal the access information which is specified based on the identification information of the first terminal which is sent from the second terminal and the identification information stored in the storage; and relaying communication to be carried out between the first and the second terminals based on the access information, wherein the system also has an authentication server that authenticates the first terminal, and the method further comprises with the authentication server associating and storing a credential of the first terminal and the identification information of the first terminal in response to a credential request from the first terminal; and sending the first authentication information of the first terminal to the first terminal in response to an authentication request from the first terminal, and sending the identification information of the first terminal to the relay server in response to a verification request of the first authentication information of the first terminal from the relay server.

10. A non-transitory computer-readable storage medium storing a program for causing a processor to execute a method of controlling a system comprising a relay server that relays communications between a first terminal and a second terminal, the method comprising:

in a case where a login request is received including first authentication information from the first terminal, associating and storing, in a storage, identification information of the first terminal corresponding to the first authentication information and access information for accessing the relay server;

sending the access information to the first terminal;

in a case where a login request has been received including second authentication information from the second terminal, sending to the second terminal the access information which is specified based on the identification information of the first terminal which is sent from the second terminal and the identification information stored in the storage; and relaying communication to be carried out between the first and the second terminals based on the access information, wherein the system also has an authentication server that authenticates the first terminal, and the method further comprises with the authentication server associating and storing a credential of the first terminal and the identification information of the first terminal in response to a credential request from the first terminal; and sending the first authentication information of the first terminal to the first terminal in response to an authentication request from the first terminal, and sending the identification information of the first terminal to the relay server in response to a verification request of the first authentication information of the first terminal from the relay server.

* * * * *